(12) United States Patent
Li et al.

(10) Patent No.: US 11,030,738 B2
(45) Date of Patent: Jun. 8, 2021

(54) IMAGE DEFECT IDENTIFICATION

(71) Applicant: International Business Machines Corporation, Armonk, NY (US)

(72) Inventors: Fan Li, Shanghai (CN); Guo Qiang Hu, Beijing (CN); Sheng Nan Zhu, Shanghai (CN); Jun Zhu, Shanghai (CN); Jing Chang Huang, Shanghai (CN); Peng Ji, Shanghai (CN); Yuan Yuan Ding, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/503,764

(22) Filed: Jul. 5, 2019

(65) Prior Publication Data

US 2021/0004945 A1    Jan. 7, 2021

(51) Int. Cl.
  *G06T 7/00* (2017.01)
  *G06K 9/62* (2006.01)
  *G06T 5/00* (2006.01)

(52) U.S. Cl.
  CPC ............ *G06T 7/001* (2013.01); *G06K 9/6267* (2013.01); *G06T 5/005* (2013.01); *G06T 2207/10048* (2013.01); *G06T 2207/30108* (2013.01)

(58) Field of Classification Search
  None
  See application file for complete search history.

(56) References Cited

U.S. PATENT DOCUMENTS

| | | | |
|---|---|---|---|
| 7,991,217 B2 | 8/2011 | Nakagaki et al. | |
| 8,150,141 B2 | 4/2012 | Nakagaki et al. | |
| 8,452,076 B2 | 5/2013 | Nakagaki et al. | |
| 8,811,712 B2 | 8/2014 | Maeda et al. | |
| 2007/0201739 A1 | 8/2007 | Nakagaki et al. | |
| 2011/0268345 A1 | 11/2011 | Nakagaki et al. | |
| 2012/0128233 A1 | 5/2012 | Nakagaki et al. | |
| 2018/0022015 A1* | 1/2018 | Terao ................... | B29C 59/002 264/40.1 |

(Continued)

FOREIGN PATENT DOCUMENTS

| | | |
|---|---|---|
| CN | 101604080 A | 12/2009 |
| CN | 107430988 A | 12/2017 |
| CN | 109035248 A * | 12/2018 |

(Continued)

OTHER PUBLICATIONS

Bergmann et al., "Improving Unsupervised Defect Segmentation by Applying Structural Similarity to Autoencoders," arXiv:1807.02011v3 [cs.CV] Feb. 1, 2019, 8 pages.

(Continued)

*Primary Examiner* — Delomia L Gilliard
(74) *Attorney, Agent, or Firm* — Patterson + Sheridan, LLP

(57) ABSTRACT

A method, a device and a computer program product for image processing are proposed. In the method, whether a first image indicates a defect associated with a target object is determined. In response to determining that the first image indicates the defect, a second image absent from the defect is obtained based on the first image. The defect is identified by comparing the first image with the second image. In this way, the defect associated with the target object in the image can be accurately and efficiently identified or segmented.

20 Claims, 7 Drawing Sheets

(56) References Cited

U.S. PATENT DOCUMENTS

2019/0050978 A9     2/2019    Sakai et al.

FOREIGN PATENT DOCUMENTS

| | | |
|---|---|---|
| CN | 109035248 A | 12/2018 |
| CN | 109118482 A | 1/2019 |
| JP | 2007225531 A | 9/2007 |
| JP | 2010151655 A | 7/2010 |
| JP | 4644613 B2 | 3/2011 |
| JP | 5275017 B2 | 8/2013 |
| JP | 6403627 B2 | 10/2018 |
| KR | 20170133501 A | 12/2017 |
| TW | 201636186 A | 10/2016 |
| WO | 2010073453 A1 | 7/2010 |
| WO | 2016166929 A1 | 10/2016 |
| WO | 2018216629 A1 | 11/2018 |

OTHER PUBLICATIONS

Yu et al., "Generative Image Inpainting With Contextual Attention," arXiv:1801.07892v2 [cs.CV] Mar. 21, 2018, 15 pages.
Zhou et al., "Learning Deep Features for Discriminative Localization," CVPR, 2016, 9 pages.
Notification of Transmittal of the International Search Report and the Written Opinion of the International Searching Authority, or the Declaration for Application No. PCT/IB2020/055527 dated Sep. 16, 2020.

\* cited by examiner

IMAGE DEFECT IDENTIFICATION

BACKGROUND

The present invention relates to image processing, and more specifically, to a method, a device and a computer program product for identifying a defect associated with a target object in an image.

Nowadays, there exists high demand on automated and accurate defect segmentation in manufactory industry. The demand on automated visual inspection technologies for the defect segmentation is increasingly growing across the manufactory industry in areas such as manual inspection of smartphone part assembling, component-level defect inspection on Printed Circuit Board (PCB) (more than 20 defect types), and Liquid Crystal Display (LCD) panel defect detection (more than 120 defect types).

Accurate defect segmentation is of significant value for determining the defect severity and the subsequent processing flow (for example, repair, rework, ignore, disposal, etc.). Due to the large amount of workload required, the inspector is more willing to perform the annotation of the defect in an image level (for example, annotate each image with a defect type label), rather than precisely determining the defect location or performing the annotation in a pixel-wise level.

SUMMARY

According to one embodiment of the present invention, there is provided a method for image processing. In the method, whether a first image indicates a defect associated with a target object is determined. In response to determining that the first image indicates the defect, a second image absent from the defect is obtained based on the first image. The defect is identified by comparing the first image with the second image.

According to another embodiment of the present invention, there is provided a device for image processing. The device comprises a processing unit and a memory coupled to the processing unit and storing instructions thereon. The instructions, when executed by the processing unit, performing acts including: determining whether a first image indicates a defect associated with a target object; in response to determining that the first image indicates the defect, obtaining a second image absent from the defect based on the first image; and identifying the defect by comparing the first image with the second image.

According to yet another embodiment of the present invention, there is provided a computer program product being tangibly stored on a non-transient machine-readable medium and comprising machine-executable instructions. The instructions, when executed on a device, cause the device to perform acts including: determining whether a first image indicates a defect associated with a target object; in response to determining that the first image indicates the defect, obtaining a second image absent from the defect based on the first image; and identifying the defect by comparing the first image with the second image.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
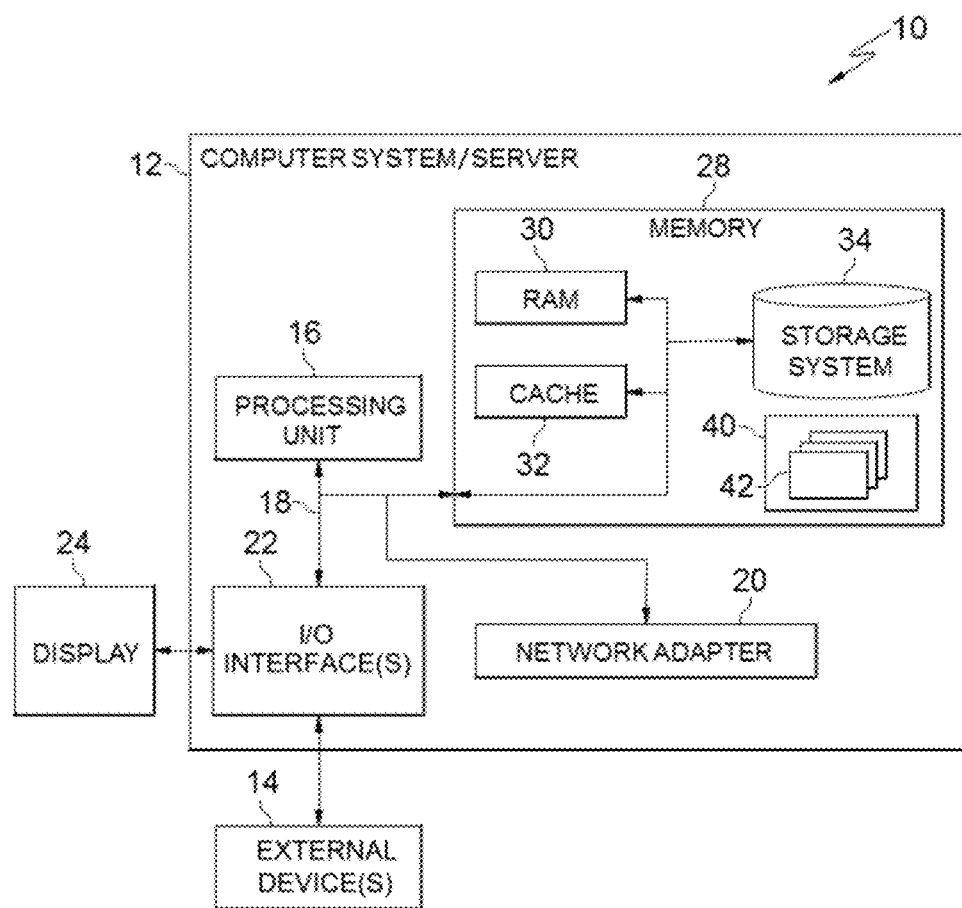
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
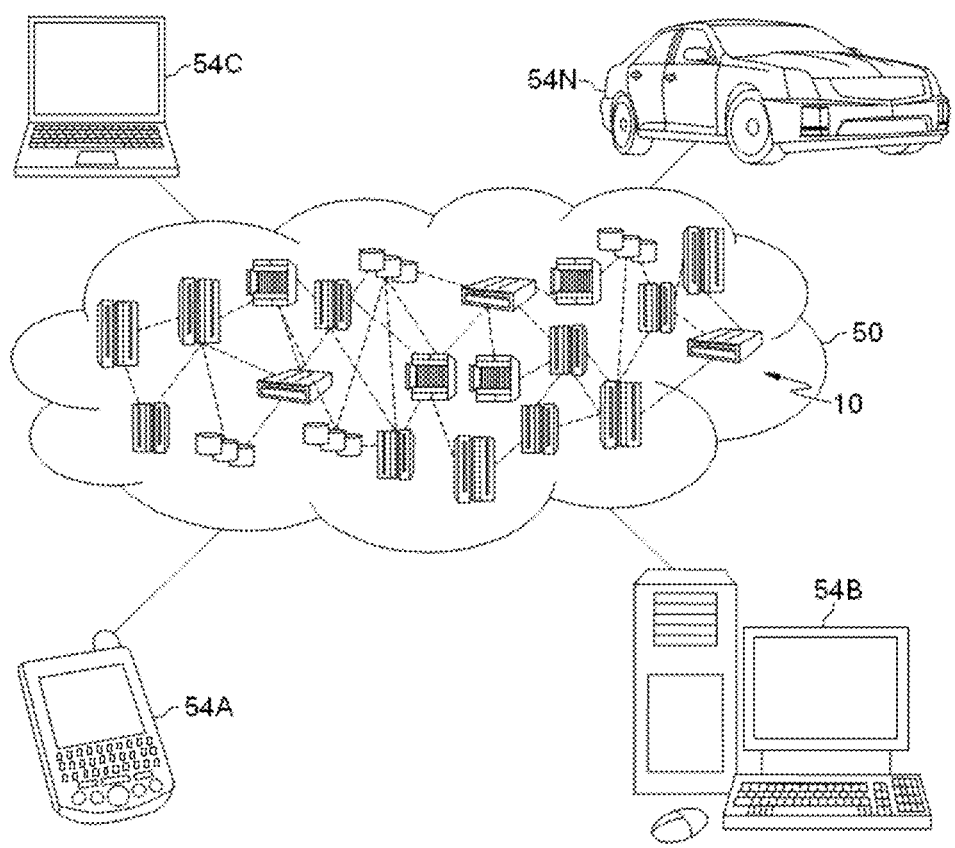
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
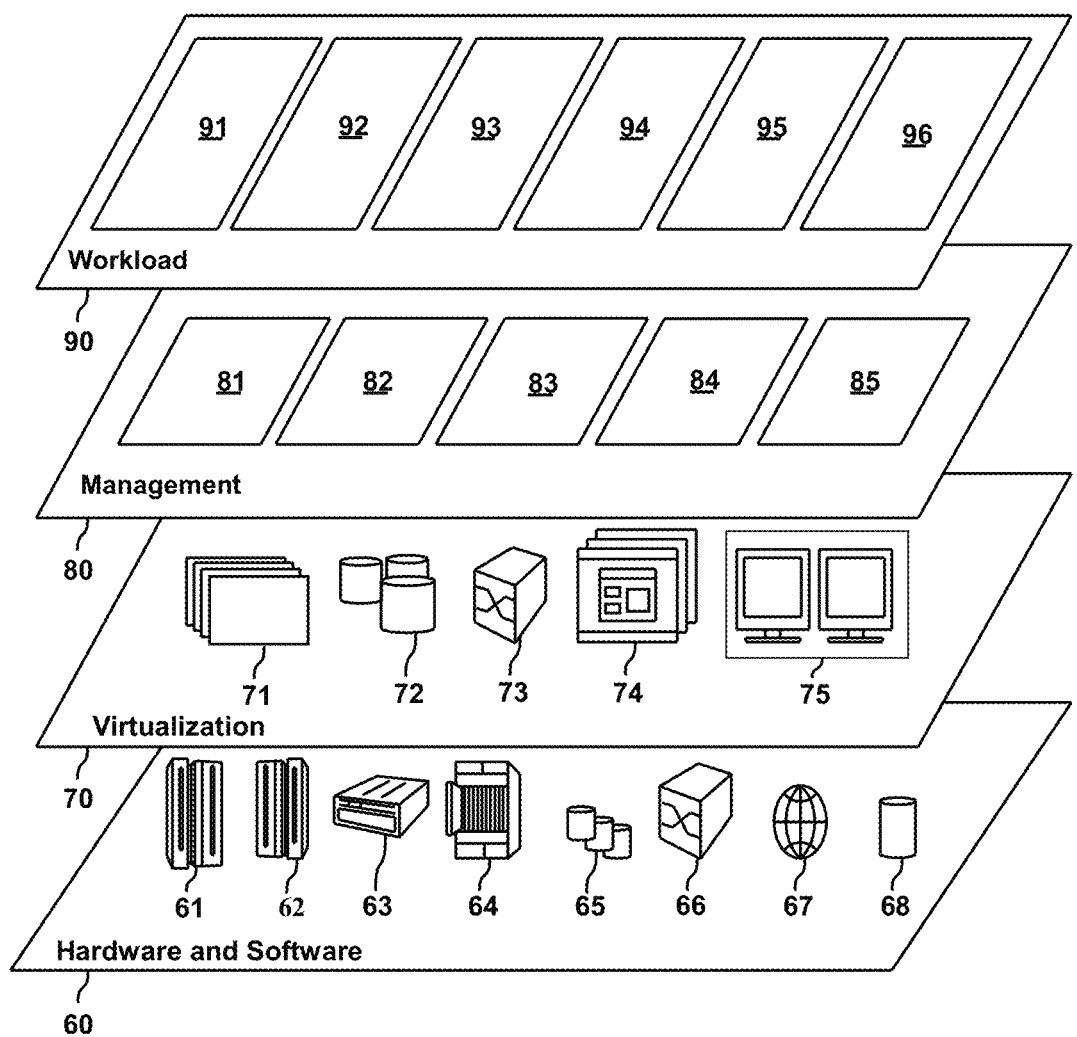
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

As discussed above, it is required that the defect segmentation can be performed based on the weakly-supervised image level annotation. Traditionally, a Fully Convolutional Network (FCN) can be used for the semantic segmentation. However, the FCN requires accurate object positioning in the granularity of pixel, and high labeling effort in training data preparation.

In addition, an attention-based approach can be used for pixel-wise classification. In the attention-based approach, object segmentation is trained with image labels. A visualization method (such as a class activation heatmap) from a pre-trained Convolutional Neural Network (CNN) classification model can be used to indicate which region in the image is relevant to a class. However, the heatmap can only cover the object of that class roughly. Moreover, only one or a few objects are indicated in the heatmap when numerous objects of the same class present in the image.

In order to at least partially solve one or more of the above problems and other potential problems, example embodiments of the present disclosure propose a solution for image processing.

Generally speaking, according to embodiments of the present disclosure, an image (referred to as "first image") of a target object can be obtained. The first image can present a certain pattern or a periodic feature, but not limited thereto. For example, the first image can be the image of the LCD/PCB panel. The first image can then be applied to an image classifier for classifying an image to be normal or abnormal. A normal image can represent an image of a target object that does not include a defect, and an abnormal image can represent an image of a target object including at least one defect. For example, the defect may be a dead pixel, a scratch, a bubble or the like in the LCD panel, or poor soldering, missing component or the like of the PCB panel.

When a result of the classifying indicating that the first image indicates a defect, a heatmap for locating the defect in the first image can be generated, and a mask covering at least a portion of the defect can be generated based on the heatmap. Then, a recovered image can be generated by removing at least a portion of the defect covered by the mask from the first image. For example, the recovered image can be generated by applying the image to be recovered with the mask to a Generative Adversarial Network (GAN) based model trained to recover the defect.

The recovered image can be applied to the image classifier. If a result of the classifying indicates that the recovered image does not include a defect, that is to say, the recovered image is a fully recovered normal image (referred to as "second image"), the defect in the first image can be identified by comparing the first image with the second image. Otherwise, the recovered image will iteratively go through further recovering process until a fully recovered normal image is obtained, such that the defect in the first image can be identified. It is to be understood that in the context of the present invention, identifying a defect in the image means that the defect segmentation is performed on the image.

In this way, the defect associated with the target object can be automatically and accurately segmented from the image. Since the image classification and recovering process of the defect segmentation is performed on the image level, the defect segmentation can be used for the weakly-supervised or image level annotation dataset. In this case, no pixel level segmentation label is required for training, causing a significant saving of location labeling in traditional object detection/image segmentation tasks. In addition, the defect segmentation of the present invention is widely applicable. It is not limited to be applied for images with rigid patterns or templates, and can be applied for images with various defect numbers or sizes. Further, the result of the defect segmentation can also be used as the segmentation annotation. Thus, the proposed solution increases the accuracy, efficiency and applicability of the defect segmentation and improves the user experience in defect inspection.

Figure 4:
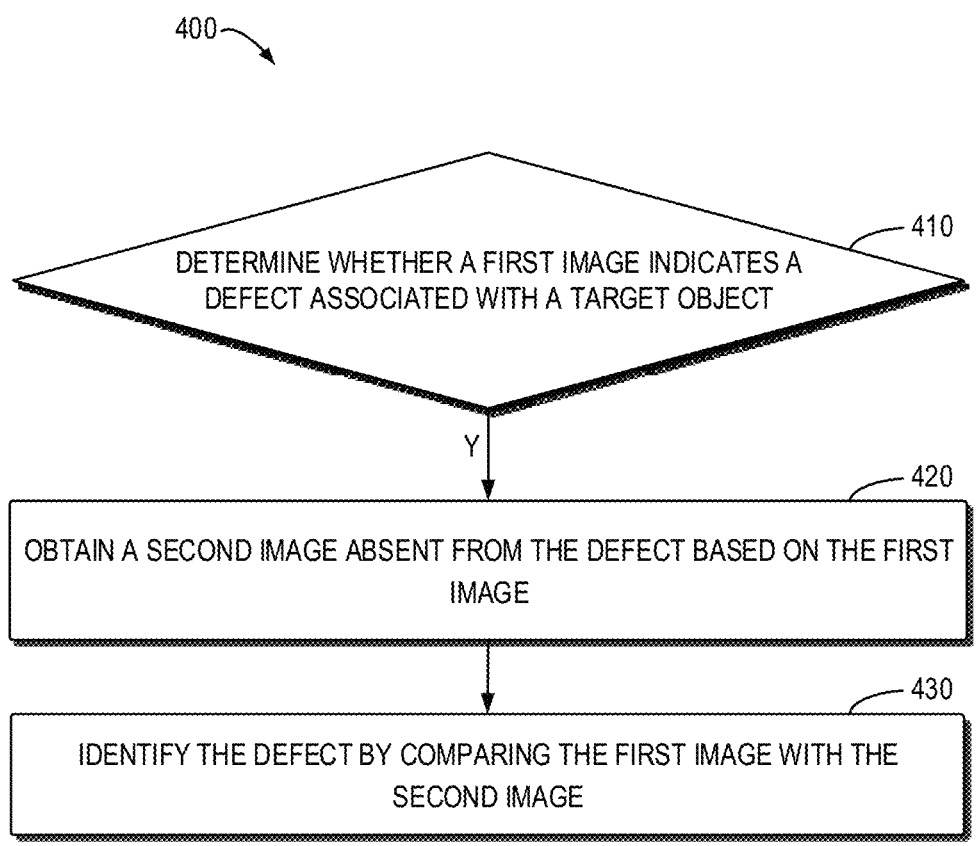
FIG. 4 shows a flow chart of an example method for image processing according to an embodiment of the present invention.
Figure 5:
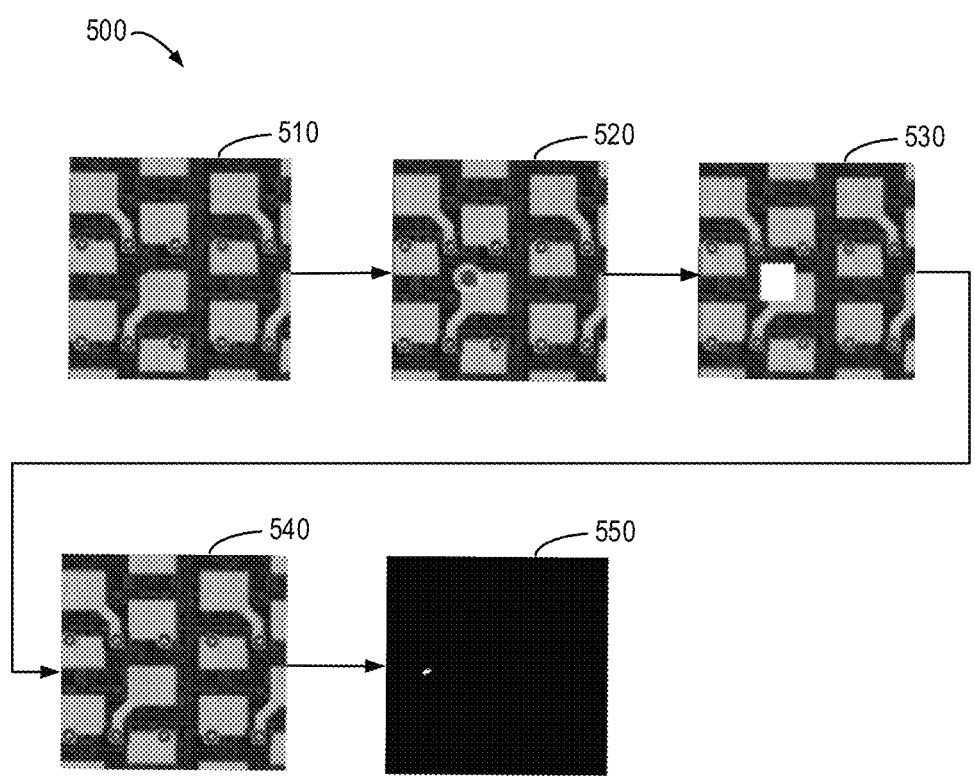
FIG. 5 shows a schematic diagram of an example defect segmentation according to an embodiment of the present invention.

Now some example embodiments will be described with reference to FIGS. 4-7. FIG. 4 shows a flow chart of an example method 400 for image processing according to an embodiment of the present invention. The method 400 may be at least in part implemented by the computer system/server 12, or other suitable systems. FIG. 5 shows a schematic diagram of an example defect segmentation 500 according to an embodiment of the present invention. For purpose of discussion, the method 400 will be described with respect to FIG. 5.

At 410, the computer system/server 12 determines whether a first image indicates a defect associated with a target object. In some embodiments, the first image can present a certain pattern or a periodic feature. For example, the first image can be the image of the LCD/PCB panel. An example of the first image is shown as the image 510 in FIG. 5.

In some embodiments, the computer system/server 12 can obtain the first image, and apply the first image to an image classifier for classifying an image to be normal or abnormal. A normal image can represent an image of a target object that does not include a defect, and an abnormal image can represent an image of a target object including a defect. The image classifier can be any suitable image classifier, for example but not limited to, a Binary Classifier model. Since the binary classifier model is trained to identify whether an image is normal or abnormal, the weakly-supervised or image level annotation dataset is enough.

As an example, in the training stage of the image classifier, a large number of images can be applied to train the image classifier. Some of images can be labeled as normal images, and the other images can be labeled as abnormal images indicating a defect. No location information regarding the defect needs to be provided. After the training process, the image classifier can achieve a high classification precision.

If a result of the classifying indicating that the first image is abnormal, the computer system/server 12 can determine that first image indicates the defect. Otherwise, it is determined that the first image does not indicate the defect.

At 420, if the first image indicates the defect, the computer system/server 12 obtains a second image absent from the defect based on the first image. An example of the second image is shown as the image 540 in FIG. 5.

In some embodiments, to generate the second image, the computer system/server 12 can generate a heatmap indicating heat values of pixels in the first image. Specifically, the heatmap can be generated by applying the first image to a class activation heatmap model being trained to locate the defect in the first image. Generally speaking, the higher the heat value of a pixel is, the more likely the pixel relates to the defect. In this case, the heatmap can locate the defect in the first image. An example of the heatmap is shown in the image 520 in FIG. 5.

However, as shown in FIG. 5, the heatmap only coarsely locates the defect in the first image. In this case, the computer system/server 12 can generate, based on the heatmap, a mask covering at least a portion of the defect. An example of the mask is shown in the image 530 in FIG. 5.

The mask usually can have a predetermined shape, such as a square shape or rectangular shape, such that the mask can more precisely locate the defect for removing the defect later. This is because the size of the mask directly influences the defect removing or image recovering performance. Generally, a smaller mask can result in a better performance.

In some embodiments, the computer system/server 12 can determine heat values of a set pixels in the first image exceeding a predetermined threshold, and generate the mask covering the set of pixels. In this way, the most suspicious defect region can be covered by the mask.

Then, the computer system/server 12 can generate the second image by removing at least the portion of the defect covered by the mask from the first image. The defect can be removed by filling the pixels of the masked region in the image with plausible pixels. For example, the second image can be generated by applying the first image with the mask to a Generative Adversarial Network (GAN) based model being trained to remove at least the portion of the defect.

The purpose of the GAN based model is to generate a masked region which looks real and nature and resembles the unmasked original image. To achieve this purpose, a large number of normal images can be used to train the GAN based model. The training can be performed by randomly masking a region in the normal images. The loss function of the GAN based model is the sum of the pixel-wise reconstruction loss and the adversarial discriminator loss. Visually, the GAN based model works for most cases, which leads to a satisfying segmentation result. In addition, since the GAN based model is trained from normal images, the GAN based model can be considered as weakly-supervised or even unsupervised.

Besides the GAN based model, other image recovering techniques for removing the defect can also be used, such as matching and copying background patches to the masked region, or matching the masked region from a database with image indexing, for example, by indexing a corresponding normal image in the database and copying the corresponding region in the indexed image to the masked region.

In addition, since various defect number or size needs to be processed, in some embodiments, the defect cannot be removed at one time. For example, the first image may be an image of a target object with more than one defect, or an image of a target object with a large defect. In these embodiments, the first image needs to be iteratively recovered to obtain the second image absent from the defect.

For example, to determine whether the recovered image generated from the first image is absent from the defect, the computer system/server 12 can obtain the recovered image (referred to as "intermediate image") by removing at least a portion of the defect from the first image. The computer system/server 12 can determine whether the intermediate image indicates the defect is completely removed from the intermediate image. If so, the computer system/server 12 can directly determine the intermediate image to be the second image.

Otherwise, if the defect is not completely removed from the intermediate image, for example, a remaining portion of the defect is still present in the intermediate image, the computer system/server 12 can remove the remaining portion of the defect from the intermediate image based on a heatmap of the intermediate image. Specifically, the computer system/server 12 can generate the heatmap indicating heat values of pixels in the intermediate image, and generate, based on the heatmap, a mask covering at least a portion of the remaining defect. Then, the computer system/server 12 can generate a further image by removing at least the portion of the remaining defect covered by the mask. The computer system/server 12 can again determine whether the further image indicates the defect is fully removed. In this way, the image recovering process is repeated iteratively, until the second image absent from the defect is obtained. Such iterative recovery can ensure the segmentation integrity.

More detailed examples regarding an image of a target object with a large defect, and an image of a target object with more than one defect are described with reference to FIGS. 6 and 7.

After obtaining the second image absent from the defect, the computer system/server 12 can identify the defect by comparing the first image with the second image, at 430. In this way, the defect can be segmented from the first image. For example, the computer system/server 12 can use a simple subtraction or mathematic morphology method to obtain the segmentation result from the first image with the second image. In addition, the segmentation result can also be used as a segmentation annotation for further processing. As an example of the segmentation result, the image 550 of FIG. 5 shows the segmented defect.

In this way, by combining the binary classifier model, the class activation heatmap model, and the GAN based model, the defect segmentation can be performed on the weakly-supervised or image level annotation dataset. In addition, such defect segmentation is widely applicable, and can be used for various defect number or size. Thus, the proposed solution increases the accuracy, efficiency and applicability of the defect segmentation and improving the user experience in defect inspection.

Figure 6:
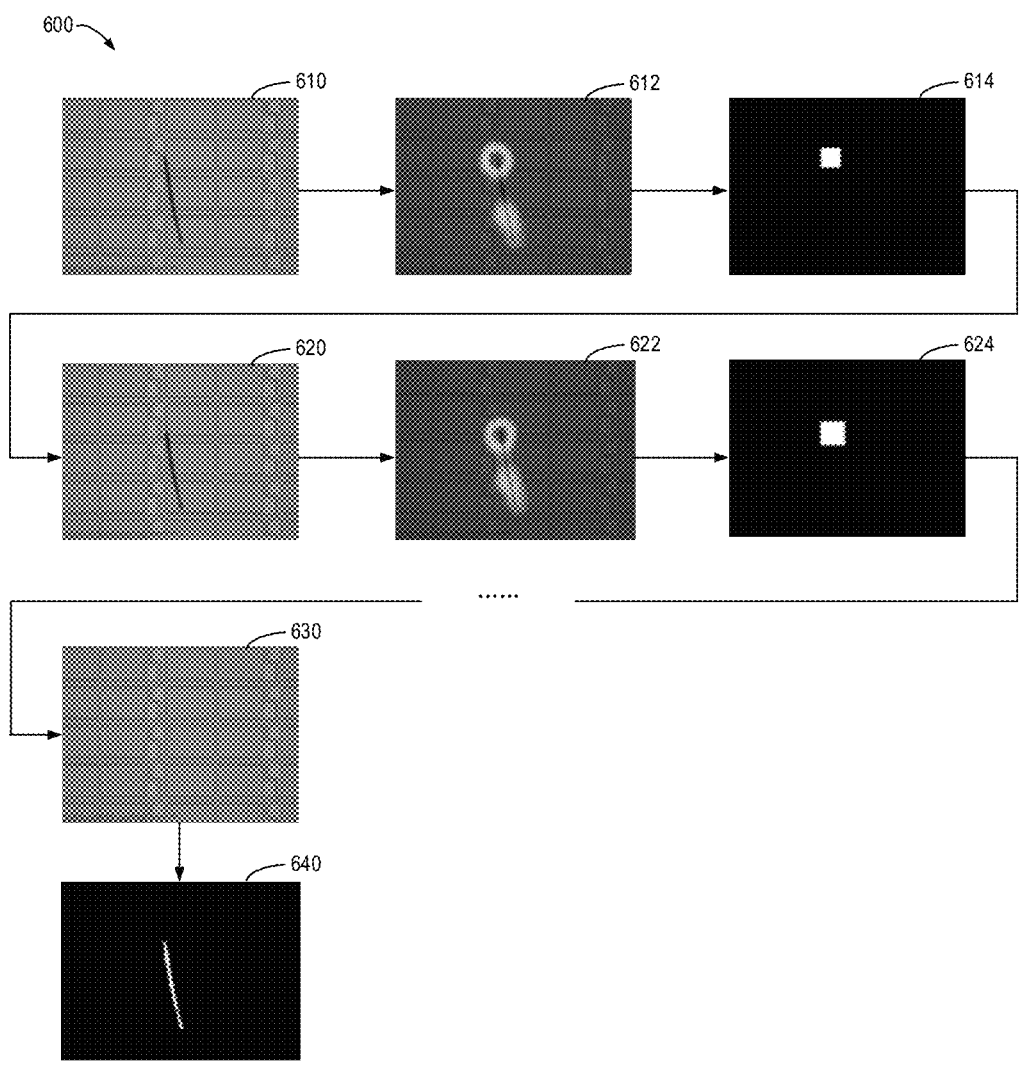
FIG. 6 shows a schematic diagram of another example defect segmentation according to an embodiment of the present invention.

FIG. 6 shows a schematic diagram of an example defect segmentation 600 for an image including a large defect according to an embodiment of the present invention. The defect segmentation 600 may be at least in part implemented by the computer system/server 12, or other suitable systems.

As shown in FIG. 6, the first image 610 includes a prolonged defect associated with a target device. The computer system/server 12 determines that the first image 610 indicates at least a defect. Next, the computer system/server 12 generates the heatmap 612 locating the defect in the first image 610. It can be seen that only a portion of the defect is emphasized in the heatmap 612. In this case, the computer system/server 12 generates the mask 614 covering only the upper portion of defect. Then, the computer system/server 12 generates the intermediate image 720 by removing the upper portion of defect covered by the mask 614.

However, the remaining portion of defect is not removed from the intermediate image 620, and the intermediate image 620 is not fully recovered. In this event, the computer system/server 12 determines that the intermediate image 620 indicates at least a defect, and performs another iteration for removing the defect. That is to say, the computer system/server 12 generates the heatmap 622 locating the remaining defect and the mask 624 covering the upper portion of the remaining defect. Then, the computer system/server 12 generates a further image by removing the upper portion of the remaining defect covered by the mask 624. The iteration for removing the defect repeats until the second image 630 exclude any defect is obtained.

The computer system/server 12 identifies or segments the defect by comparing the first image 610 with the second image 630. The defect segmentation result is shown in the image 640, which shows the segmented prolonged defect. In this way, the defect with a large size or length in the image can be precisely segmented by recovering the defective image, and comparing the original image with the recovered image.

Figure 7:
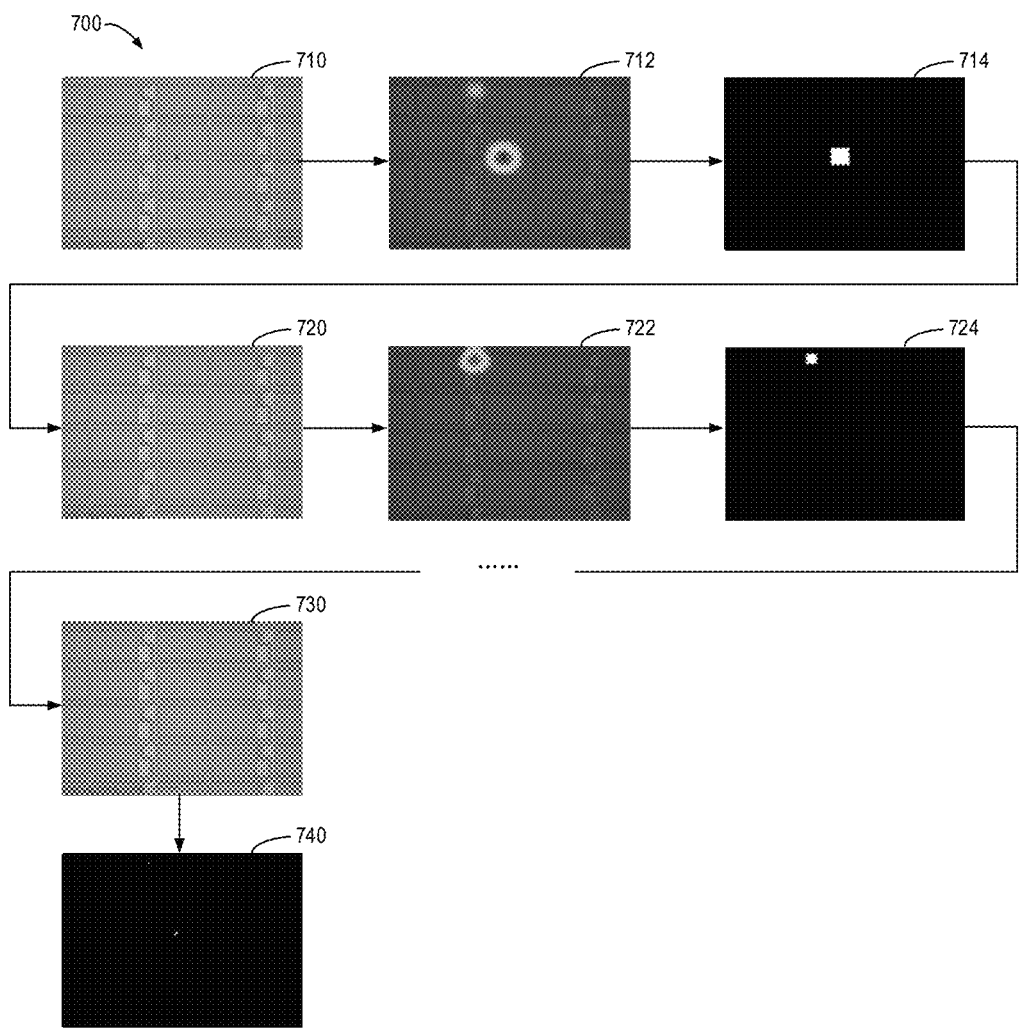
FIG. 7 shows a schematic diagram of yet another example defect segmentation according to an embodiment of the present invention.

FIG. 7 shows a schematic diagram of an example defect segmentation 700 for an image including multiple defects according to an embodiment of the present invention. The defect segmentation 700 may be at least in part implemented by the computer system/server 12, or other suitable systems.

As shown in FIG. 7, the first image 710 includes two defects associated with a target device. The computer system/server 12 determines that the first image 710 indicates at least a defect. Next, the computer system/server 12 generates the heatmap 712 locating the defects in the first image 710. Although the heatmap 712 locates both defects, the lower defect is emphasized in the heatmap 712. In this case, the computer system/server 12 generates the mask 714 covering only the lower defect. Then, the computer system/server 12 generates the intermediate image 720 by removing the lower defect covered by the mask 714.

However, the upper defect is not removed from the intermediate image 720, and the intermediate image 720 is not fully recovered. In this event, the computer system/server 12 determines that the intermediate image 720 indicates at least a defect, and performs another iteration for removing the defect. That is to say, the computer system/server 12 generates the heatmap 722 locating the upper defect and the mask 724 covering the upper defect. Then, the computer system/server 12 generates the second image 730 by removing the upper defect covered by the mask 724.

Finally, the computer system/server 12 determines that the second image 730 does not include any defect, and identifies or segments the defect by comparing the first image 710 with the second image 730. The defect segmentation result is shown in the image 740, which shows the two segmented defects. In this way, the multiple defects in the image can be precisely segmented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for image processing, comprising:
   determining, by one or more processors, whether a first image indicates a defect associated with a target object;
   in response to determining that the first image indicates the defect:
      generating, based on a heatmap, a mask covering a portion of the defect; and
      generating the second image by removing, from the first image, the portion of the defect; and
   identifying, by the one or more processors, the defect by comparing the first image with the second image.

2. The computer-implemented method of claim 1, wherein determining whether the first image indicates the defect comprises:
   applying, by the one or more processors, the first image to an image classifier for classifying an image to be normal or abnormal; and
   in response to a result of the classifying indicating that the first image is abnormal, determining, by the one or more processors, that the first image indicates the defect.

3. The computer-implemented method of claim 2, wherein the image classifier is a Binary Classifier model.

4. The computer-implemented method of claim 1, wherein the heatmap indicates heat values of pixels in the first image.

5. The computer-implemented method of claim 1, further comprising generating the heatmap by applying the first image to a class activation heatmap model being trained to locate the defect in the first image.

6. The computer-implemented method of claim 1, wherein generating the mask comprises:
   determining, by the one or more processors, heat values of a set of pixels in the first image exceeding a predetermined threshold; and
   generating, by the one or more processors, the mask covering the set of pixels.

7. The computer-implemented method of claim 1, wherein generating the second image comprises
   applying the first image with the mask to a Generative Adversarial Network (GAN) based model being trained to remove at least the portion of the defect.

8. The computer-implemented method of claim 1, wherein generating the second image comprises:
   obtaining, by the one or more processors, an intermediate image by removing at least the portion of the defect from the first image;
   in response to the defect being absent from the intermediate image, determining, by the one or more processors, the intermediate image to be the second image; and
   in response to a remaining portion of the defect being present in the intermediate image, removing, by the one or more processors, the remaining portion from the intermediate image based on a heatmap of the intermediate image to generate the second image.

9. A device for image processing, comprising:
   a processor; and
   a memory coupled to the processor and storing instructions thereon, the instructions, when executed by the processor, performing acts including:
      determining whether a first image indicates a defect associated with a target object;
      in response to determining that the first image indicates the defect:
         generating, based on a heatmap, a mask covering a portion of the defect; and
         generating the second image by removing, from the first image, the portion of the defect; and
      identifying the defect by comparing the first image with the second image.

10. The device of claim 9, wherein determining whether the first image indicates the defect comprises:
    applying the first image to an image classifier for classifying an image to be normal or abnormal; and
    in response to a result of the classifying indicating that the first image is abnormal, determining that the first image includes the defect.

11. The device of claim 10, wherein the image classifier is a Binary Classifier model.

12. The device of claim 9, wherein the heatmap indicates heat values of pixels in the first image.

13. The device of claim 9, wherein the acts further include generating the heatmap by applying the first image to a class activation heatmap model being trained to locate the defect in the first image.

14. The device of claim 9, wherein generating the mask comprises:
    determining heat values of a set of pixels in the first image exceeding a predetermined threshold; and
    generating the mask covering the set of pixels.

15. The device of claim 9, wherein generating the second image comprises
    applying the first image with the mask to a Generative Adversarial Network (GAN) based model being trained to remove at least the portion of the defect.

16. The device of claim 9, wherein generating the second image comprises:
    obtaining an intermediate image by removing at least the portion of the defect from the first image;
    in response to the defect being absent from the intermediate image, determining the intermediate image to be the second image; and
    in response to a remaining portion of the defect being present in the intermediate image, removing the remaining portion from the intermediate image based on a heatmap of the intermediate image to generate the second image.

17. A computer program product, comprising a non-transitory computer readable storage medium having program instructions embodied therewith, the program instructions executable by a processor to cause the processor to perform actions of:
    determining whether a first image indicates a defect associated with a target object;
    in response to determining that the first image indicates the defect:

generating, based on a heatmap, a mask covering a portion of the defect; and generating the second image by removing, from the first image, the portion of the defect; and identifying the defect by comparing the first image with the second image.

18. The computer program product of claim 17, wherein determining whether the first image indicates the defect comprises:

applying the first image to an image classifier for classifying an image to be normal or abnormal; and in response to a result of the classifying indicating that the first image is abnormal, determining that the first image includes the defect.

19. The computer program product of claim 17, wherein the heatmap indicates heat values of pixels in the first image.

20. The computer program product of claim 17, wherein generating the second image comprises:

obtaining an intermediate image by removing at least the portion of the defect from the first image;

in response to the defect being absent from the intermediate image, determining the intermediate image to be the second image; and in response to a remaining portion of the defect being present in the intermediate image, removing the remaining portion from the intermediate image based on a heatmap of the intermediate image to generate the second image.

* * * * *